BEST AVAILABLE COPY

Kelsey & Potter,

Cotton Press.

No. 50.

A.I. Patent... Feb. 1, 1842.

UNITED STATES PATENT OFFICE.

BEST AVAILABLE COPY

JAMES E. KELSEY, OF POUGHKEEPSIE, NEW YORK, AND JAMES A. POTTER, OF PROVIDENCE, RHODE ISLAND.

IMPROVEMENT IN COTTON-PRESSES.

Specification forming part of Letters Patent No. 1,798, dated September 25, 1840; Additional Improvement No. 50, dated February 1, 1842.

*To all whom it may concern:*

Be it known that we, JAMES E. KELSEY, of the town of Poughkeepsie, county of Dutchess, and State of New York, and JAMES A. POTTER, of the city of Providence, county of Providence, and State of Rhode Island, have invented a new and useful Improvement in the Cotton-Press for which Letters Patent of the United States have been granted; and we do hereby declare that the following is a full, clear, and exact description of the construction and operation of the same, reference being had to the annexed drawings, making a part of this specification, in which—

Figure 1:
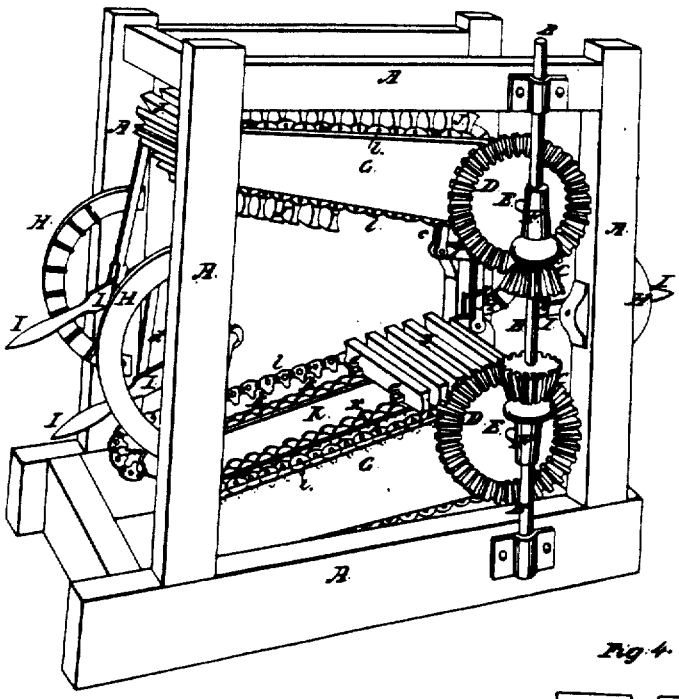
Figure 2:
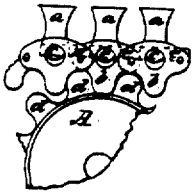
Figure 3:
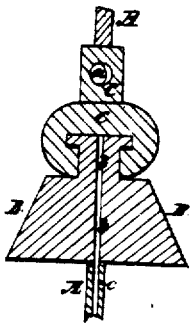
Figure 4:
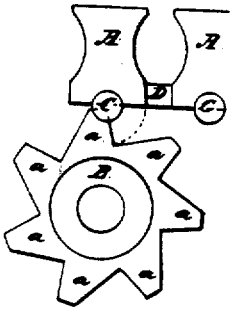
Figure 5:
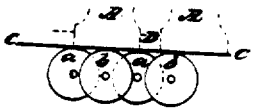

Figure 1 is a perspective representation of our machine. Fig. 2 represents the form of the links *b b b* of the endless chain to which the cross-bars *a a a*, forming the endless floors, are attached, all of which will be presently described. Fig. 3 shows a portion of the main driving-shaft, with a sectional view of the bevel-gearing, its mode of operation, &c. Fig. 4 represents the cog-wheel over which the cross bars or slats of the endless floors turn, and on which they alternately rest while passing each end of the platform. Fig. 5 shows the position of the friction-rollers in the two interior bars of the platform on which the endless floor moves.

The construction and operation of the machine may be thus described in detail.

A A A A, &c., Fig. 1, is a stout frame, placed, if required, on wheels, to enable it to be easily transported from place to place.

B B is the main driving-shaft, at the top of which is proper gearing, by which the motive power is applied to the machine.

C F and C F are cylinders and bevel-pinions, which slide up and down upon the shaft B B B. These pinions mesh into and propel the bevel cog-wheels D D. The shafts of the bevel-wheels enter the cylinders F F at the point *a*, as seen in Fig. 3. These cylinders merely perform the part of sustaining the shafts E E and the pinions C C, Fig. 1, or B B, Fig. 3. In the pinion B B, Fig. 3, is a key, *b*, which slides in the groove *c*, made in the main driving-shaft, and thus causes the pinion to revolve with the shaft, while the cylinder C C, Fig. 3, does not revolve, but serves to keep the pinion in connection with the wheel D, Fig. 1, and, together with the pinion, moves up and down upon the main shaft B B, Fig. 1. The object to be obtained in having the cylinders and pinions slide upon the shaft is to enable the operator to adjust the endless floors without danger of deranging the gearing.

G G, Fig. 1, are the two platforms on which the endless floors are placed and to which the wheels D D are attached. Through one end of each of these platforms the shaft of the wheel D passes, to which the cog-wheels A, Fig. 2, and B, Fig. 4, are attached. The former (of which there are two to each platform) are used for moving the endless chains *l l l l*, the links and their mode of connection with the driving-wheel being represented in Fig. 2. The latter (of which there are three to each platform) are placed at the ends of the inner bars, K, of the platform, and serve to support and direct the movement of the endless floor J as it revolves.

In Fig. 4, A A represent the bars or slats of the floor. C is the pivot, which works in the links of the chain, as shown by *c c c c*, Fig. 2. As the floor revolves, the bottom of the bars alternately rest upon the cogs *a a a* of the wheel B, Fig. 4, which perform the functions of the drum described in our former patent.

In Fig. 1, *l l* are the links of the endless chain, and *m*, shows the wheel A, Fig. 2, over which the chain passes, and by which (at the opposite end) it is moved. The holes in the links for the pivots of the floor-bars are circular; but the under side of the pivots is somewhat flattened, as seen in *c c c*, Fig. 2, to allow of some play to enable them to turn freely around the ends of the platform.

J J J, Fig. 1, represent the bars which form the endless floor. We have left off some of the bars at the top, to enable us to show the connecting-point of the lever I with the link or connecting-rod *c*, and we have also omitted them at the bottom to allow us to represent the series of friction-rollers *k k k k*, on which the floor moves, and the relative position of the endless chain. It will be observed that from the lower part of the first bar of the lower floor there are projections (marked *c e*) immediately over the friction-rollers *k k*, &c. The

BEST AVAILABLE COPY projections are upon all of the bars, and are made to connect them in such a manner as to present an even and unbroken surface to the rollers, whereby the motion is rendered steady. The friction-rollers *k k k* are placed between two plates of iron, K, and are so arranged by a proximity of shaft and periphery as to present to the bar J an almost unbroken surface. Their relative position is shown in Fig. 5, where *a a a* represent one set of rollers and *b b b* another, C the base-line of the floor, A A the bars of the floor, and D the connecting projections.

I I I I, Fig. 1, are levers attached to the endless floors at each end of the press, and by which they are made to approach toward or recede from each other, as described in our former Letters Patent. As in the former case, their fulcra are upon the posts A A, and they are connected with the upper and lower floors by connecting rods or links *c d c d*, and move both simultaneously. The levers I I are retained in place by pins, catches, or by projections, as represented in our drawings, attached to semicircular supports H H.

Having thus fully described our machine, with its improvements, for which we desire to obtain Letters Patent, we deem it necessary only to add that in general proportions and kind and strength of materials our improved press is similar to the former one before alluded to, and in its operations it is generally the same.

What we claim as our invention and improvement, and desire to secure by Letters Patent, is—

The method of constructing and arranging the bevel-gearing so as to allow of the endless platform approaching or receding in the operation of pressing by combining with the bevel cog-wheels D D, (by which the platforms are operated,) the sliding pinions and cylinders C F and C F, the shafts of the beveled wheels D D entering said cylinders and rendering them movable with the platforms, also the levers I for regulating the distance between the platforms, the whole being constructed and operated as set forth in the foregoing specification.

JAMES E. KELSEY.
JAMES A. POTTER.

Witnesses:
WM. P. ELLIOT,
EDM. MAHER.